United States Patent [19]

Leenders et al.

[11] Patent Number: 5,169,744
[45] Date of Patent: Dec. 8, 1992

[54] INFRA-RED LASER BEAM SENSITIVE RECORDING MATERIAL

[75] Inventors: Luc H. Leenders, Herentals; Rudolf Van den Bergh, Herenthout; Marcel J. Monbaliu, Mortsel; Paul R. Callant, Edegem, all of Belgium

[73] Assignee: Agfa-Gevaert, N.V., Mortsel, Belgium

[21] Appl. No.: 639,230

[22] Filed: Jan. 9, 1991

[30] Foreign Application Priority Data

Jan. 16, 1990 [EP] European Pat. Off. ........ 90200112.2

[51] Int. Cl.$^5$ ............................................. G11B 7/24
[52] U.S. Cl. ................................... 430/495; 430/944; 430/945; 430/270; 346/135.1
[58] Field of Search ................. 430/495, 19, 342, 270, 430/944, 962, 945, 332, 334, 335; 346/135.1

[56] References Cited

U.S. PATENT DOCUMENTS

| | | | |
|---|---|---|---|
| 4,178,183 | 12/1979 | Ciurca et al. | 430/553 |
| 4,513,071 | 4/1985 | Mey | 430/19 |
| 4,737,443 | 4/1988 | Niwa et al. | 430/270 |
| 4,839,267 | 6/1989 | Monbaliu et al. | 430/546 |
| 5,030,544 | 7/1991 | Olbrechts et al. | 430/140 |
| 5,079,061 | 1/1992 | Hashida et al. | 428/64 |

FOREIGN PATENT DOCUMENTS 0192778  9/1986  European Pat. Off. .

OTHER PUBLICATIONS

Research Disclosure 28945, May 1988, Monbaliu et al., pp. 293-295.

Primary Examiner—Charles L. Bowers, Jr.
Assistant Examiner—John A. McPherson
Attorney, Agent, or Firm—Breiner & Breiner

[57] ABSTRACT

A recording material suited for forming a direct-read-after-write image by laser beam radiation, which recording material contains in a recording layer a naphthoquinonimine dye either or not in admixture with a hydrophobic polymer, characterized in that said naphthoquinonimine dye is present in the recording layer in microcrystalline state having a particle size in the range of 0.01 to 0.1 micron hereby showing an absorption maximum situated in the 800 to 880 nm wavelength range, the weight ratio of said dye to said polymer being in the range from 1/99 to 100/0.

9 Claims, 4 Drawing Sheets

INFRA-RED LASER BEAM SENSITIVE RECORDING MATERIAL

DESCRIPTION

1. Field of the Invention

The present invention relates to an information recording medium being sensitive to heat-producing electromagnetic radiation, e.g. laser beam radiation, providing optically retrievable changes and a recording process wherein said medium is applied.

2. Background of the Invention

It is known to apply informationwise modulated laser beams to modify the optical characteristics of certain recording materials.

For example in U.S. Pat. No. 3,723,121 a thermochromic material is described which in its unexposed state, absorbs, but in exposed state, transmits the laser beam. No method of erasing the image is mentioned.

According to U.S. Pat. No. 4,513,071 a recording material sensitive to laser beam irradiation is described wherein the recording material contains an aggregate dye complex layer. The aggregate dye complex reverts to a homogeneous state in the selected areas that have been exposed to a deaggregating force. The result is a colour change in the exposed areas. The recorded information can be erased by softening the recording composition sufficiently so that reaggregation occurs. Erasure can be effected by heating the composition sufficiently to soften it. The temperature and duration of heating required will vary depending on the composition of the aggregate dye complex.

According to last mentioned US-P particularly useful aggregating dyes are pyrylium dyes, including pyrylium, thiapyrylium, selenapyrlium and telluropyrylium dye salts that are forming an aggregate dye complex, also called "co-crystalline complex", with certain polymers. For that purpose polymers and copolymers including an alkylidene diarylene group in their recurring units such as in film-forming polycarbonate resins are preferred. The term "co-crystalline complex" is used to refer to a complex which contains dye and polymer molecules or dye-dye molecules co-crystallized. The recording element is formed by coating the aggregate dye complex from a solvent such as a hydrocarbon or halogenated hydrocarbon liquid.

In published EP-A 0 192 778 an optical recording medium for conducting recording and reproduction by irradiating with laser beams is described, wherein the laser beam energy causes changes in optical properties of said medium which comprises a substrate carrying an indophenol dye, also known as indoaniline or quinonimine dye.

Indophenol dyes are highly soluble in organic solvents and capable of depositing easily in the form of layers having a high reflectivity with good preservation stability. In such layers contrastly patterns in the form of pits of uniform and clear form by digital laser beam recording can be formed. None of the indophenol dyes disclosed in said EP-A 0 192 778 has a maximum absorption wavelength in the range of 800 to 880 nm which is a wavelength range wherein fairly cheap commercially available solid state lasers are emitting.

SUMMARY OF THE INVENTION

In one aspect the invention is directed to a recording material containing naphthoquinonimine dyes absorbing in the range of 800 to 880 nm showing by laser beam irradiation in that wavelength range a hypsochromic shift in colour or other optically detectable change. Said material needs no image fixation and has add-on possibilities, i.e. area not struck before by laser beam can be used for further image recording.

In another aspect the invention is directed to a recording method for directly forming a "direct-read-after-write" (DRAW) image by hypsochromic colour shift and/or another optically detectable deformation in said recording material using informationwise modulated laser beam radiation in the 800 to 880 nm wavelength range.

Other aspects and objects of the present invention will appear furtheron from the description and drawings.

In accordance with the present invention a recording material suited for forming a direct-read-after-write image by laser beam radiation is provided, which recording material contains in a recording layer a naphthoquinonimine dye either or not in admixture with a hydrophobic polymer, characterized in that said naphthoquinonimine dye is present in the recording layer in microcrystalline state having a particle size in the range of 0.01 to 0.3 micron hereby showing an absorption maximum situated in the 800 to 880 nm wavelength range, the weight ratio of said dye to said polymer being in the range from 1/99 to 100/0.

In a recording process according to the present invention said recording layer containing said naphthoquinone dye in microcrystalline state is exposed to a high intensity photon-energy beam of an infra-red laser emitting in the 800 to 880 nm wavelength range, said beam being modulated imagewise or informationwise by analogue or digital signal information and wherein the irradiation intensity of said beam is such that an hypsochromic shift of the colour of the recording layer is obtained by destroying the microcrystalline structure of said dye and/or an optically detectable deformation of said recording layer is obtained.

In a preferred recording material according to the present invention the colour of its recording layer is capable of undergoing a hypsochromic shift (shift to the blue) of at least 100 nm on irradiation with a semiconductor GaAs laser emitting at 824 nm and striking the recording layer with a laser beam having a spot diameter of 3 $\mu$m and power at the recording layer surface of 27 mW. When the laser beam energy at said wavelength is above $2.10^3$ J/m$^2$ a laser beam pulse of 300 nanoseconds forms in the recording layer a micro-pit with sharply defined edge.

DETAILED DESCRIPTION OF PREFERRED EMBODIMENTS

Figure 1:
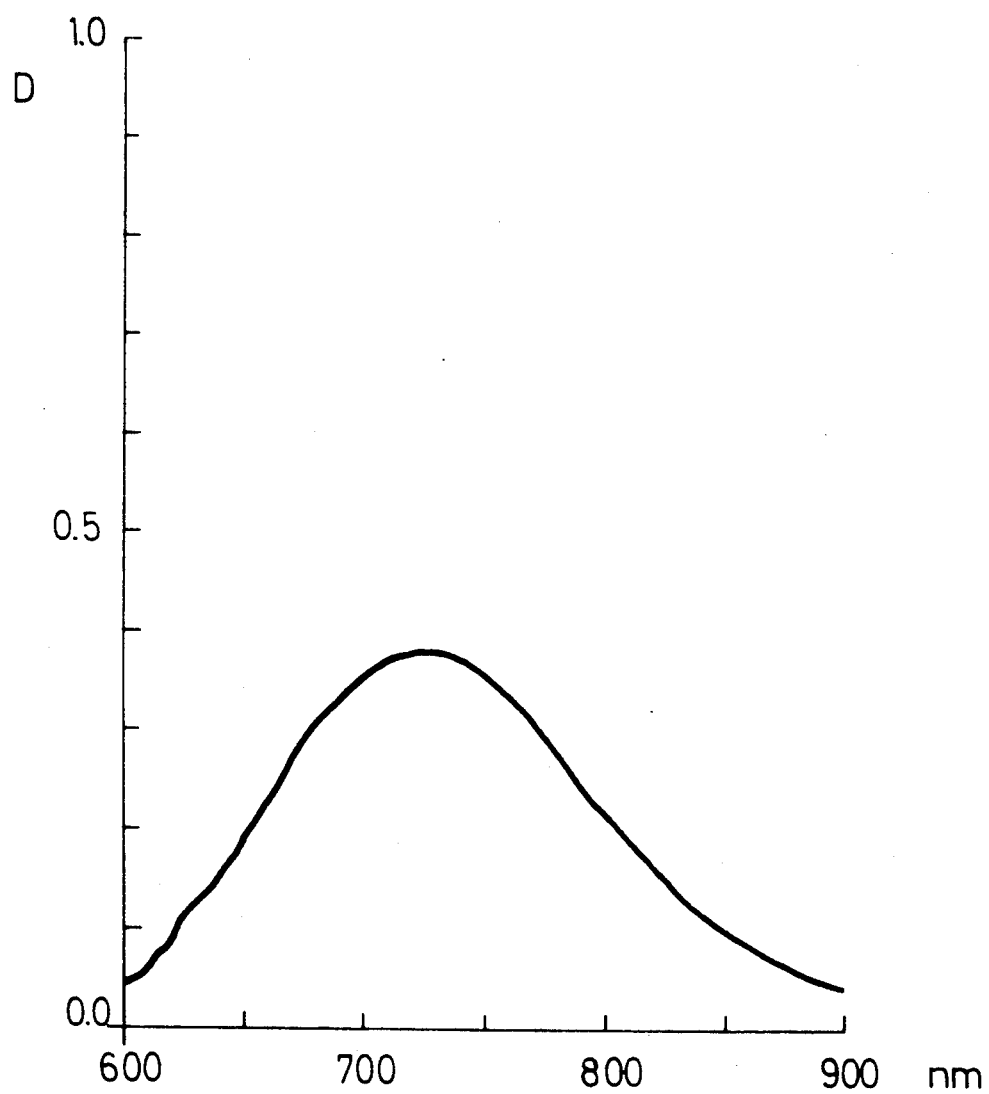
FIG. 1 represents the absorption curve (optical density D versus wavelength in nm) of a preferred naphthoquinonimine dye in a resin binder recording layer before obtaining the microcrystalline state.

Preferred naphtoquinonimine dyes for use according to the present invention are coupling products of a 1-hydroxy-2-N-(thiazol-2-yl)-naphthamide couplers with an oxidized p-phenylene diamine known from silver halide colour photography, e.g. 2-amino-5-diethylamino-toluene hydrochloride, 2-amino-5-[N-ethyl-N-(methylsulphonylamino)-ethyl]-aminotoluene sulphate, 4-amino-3-methyl-N-ethyl-N-(Beta-hydroxyethyl)-aniline sulphate and N,N-diethyl-p-phenylene diamine sulphate.

Examples of said dyes are obtained by coupling of an oxidized p-phenylene diamine dye developing agent with a cyan dye forming coupler described in U.S. Pat. No. 4,178,183, published EP-A 0176628, 0268704 and Research Disclosure 28945 (May 1988).

The synthesis of said cyan dye forming couplers may proceed by techniques described in said last mentioned published EP-A documents.

In U.S. Pat. No. 4,178,183 the term "microcrystalline dye" has been discussed and refers to a dye which is present in crystalline form but of which the crystals are too small to be visually detectable with the unaided eye. The crystals are even of submicroscopic size. The particle size of the microcrystalline dye particles used according to the present invention has been determined by Transmission Electron Microscopy (TEM) at an enlargement of 40,000. The TEM Electron Microscopy was carried out with the EM400 apparatus of PHILIPS PROFESSIONAL SYSTEMS (marketed by PHILIPS N.V. Eindhoven, The Netherlands).

Analytical techniques as X-ray diffraction and detection of birefringence have been employed to identify the crystalline structure.

Naphthoquinonimine dyes suitable for use according to the present invention correspond to the following general formula:

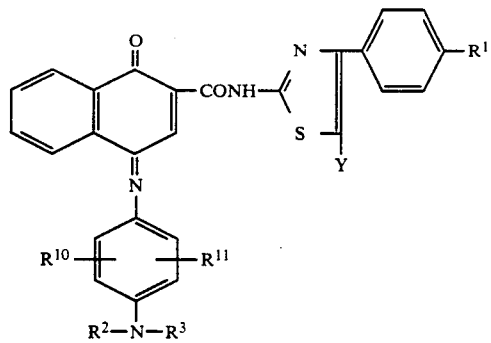

wherein:
$R^1$ is hydrogen, a $C_1$-$C_4$ alkyl group, e.g. methyl, or a $C_1$-$C_4$ alkoxy group including such alkoxy group substituted with halogen such as fluorine, e.g. a difluoro substituted methoxy or ethoxy group, Y is hydrogen or an alkyl group, e.g. a $C_1$-$C_{18}$ alkyl group, each of $R^{10}$ and $R^{11}$ (same or different) is hydrogen, methyl, methoxy or acylamino, and each of $R^2$ and $R^3$ (same or different) is hydrogen, an alkyl group including a substituted alkyl group, e.g. ethyl, Beta-hydroxyethyl or (methylsulphonylamino)-ethyl.

Particularly useful naphthoquinonimine dyes are listed with their structural formula in the following Table wherein also the wavelength in nanometer (nm) of maximum absorption before (BS) hypsochromic shift and after (AS) hypsochromic shift in polystyrene binder coated from methylene chloride is given. The dye to binder weight ratio is 1/1.

TABLE

| Dye No. | Structural Formula | BS nm | AS nm |
|---|---|---|---|
| 1 | | 860 | 719 |

TABLE-continued

| Dye No. | Structural Formula | BS nm | AS nm |
|---|---|---|---|
| 2 | (naphthoquinone-CONH-C(=N-C6H4-OCH3)-S-(CH2)7CH3; with =N-C6H3(CH3)-N(C2H5)2) | 867 | 718 |
| 3 | (naphthoquinone-CONH-C(=N-C6H4-OCH3)-S-(CH2)3CH3; with =N-C6H3(CH3)-N(C2H5)2) | 870 | 717 |
| 4 | (naphthoquinone-CONH-C(=N-C6H4-OCH3)-S-(CH2)13CH3; with =N-C6H4-N(C2H5)2) | 860 | 720 |
| 5 | (naphthoquinone-CONH-C(=N-C6H4-OCH3)-S-(CH2)3-CH3; with =N-C6H3(CH3)-N(C2H5)(CH2)2-OH) Shows some colour shift already at room temperature | 820 | |

TABLE-continued

| Dye No. | Structural Formula | BS nm | AS nm |
|---|---|---|---|
| 6 | (structure) | 822 | 716 |

Examples of hydrophobic polymers useful for serving as binder for the microcrystalline naphthoquinonimine dyes applied according to the present invention are film forming and belong to the following group:

Polycarbonates, polyesters, polyester-polycarbonates, polythiocarbonates, polyvinyl ethers, polyvinyl butyral, polyvinyl acetate, polystyrene, poly(Alpha-methylstyrene), polymethyl methacrylate (PMMA), copolymers of styrene with a (meth)acrylic ester, copolymers of styrene with butadiene, phenol-formaldehyde resins, polyolefins and chlorinated polyolefins. Mixtures of said polymers can also be utilized. Examples of said polymers are set out in Table 2 of U.S. Pat. No. 4,513,071.

Preferred hydrophobic polymers for use as film-forming binder resins are polystyrene and polymethyl methacrylate.

In the recording layer generally dye a concentration sufficient to reach in the absorption maximum a spectral density of at least 0.1 is preferred. In practice a dye coverage of at least 0.10 g/m² gives good laser beam writing results. The dye to binder ratio by weight is preferably in the range of 1/9 to 1/1.

According to a preferred embodiment the recording layer is formed by coating a solution of the naphthoquinonimine dye and polymer(s) serving as binder from an organic waterfree solvent or solvent mixture onto a support being a transparent or reflecting substrate for light used in the reading of the laser beam written information. Suitable solvents are aromatic hydrocarbons, e.g. toluene, ketones such as acetone and ethylmethyl ketone, tetrahydrofuran, halogenated hydrocarbons, methylene chloride and alcohols, e.g. methanol, ethanol and benzyl alcohol and mixtures of these solvents.

The support can be paper, metal or resin film either or not coated with vapour-deposited metal layer, e.g. a light-reflecting aluminum layer.

The support can be in the form of a disk, foil, tape or web.

A recording layer may be formed on both sides of the support. The coating proceeds by methods known in the art, e.g. by spin-coating or doctor blade coating.

The exposure of the recording material according to the present invention proceeds advantageously with a fairly cheap solid state Ga-As injection laser emitting at 824 nm with a power output of 40 mW.

Erasure of the information written as a hypsochromic absorption shift of the recording layer may proceed by heating the layer composition above the glass transition temperature (Tg) of the polymeric binder and melting point of the dye, whereupon the composition is allowed to return slowly to room temperature (20° C.) in order to restore the microcrystalline state of the dye and the therewith corresponding absorption spectrum.

The following examples illustrate the present invention without however, limiting it thereto. All parts percentages and ratios are by weight unless otherwise indicated.

EXAMPLE 1

In 100 ml of methylene chloride 1 g of naphthoquinonimine dye No. 1 of the Table and 1 g of polystyrene (Tg value: 76° C.) were dissolved. From the obtained solution 200 microliter were spin-coated at 4000 rpm within a period of 20 s onto a subbed polyethylene support having a thickness of 100 μm. The coated area had a diameter of 5 cm.

The absorption spectrum (density D versus wavelength in nm) obtained after drying the spin-coated recording layer at 20° C. is shown in FIG. 1.

Figure 2:
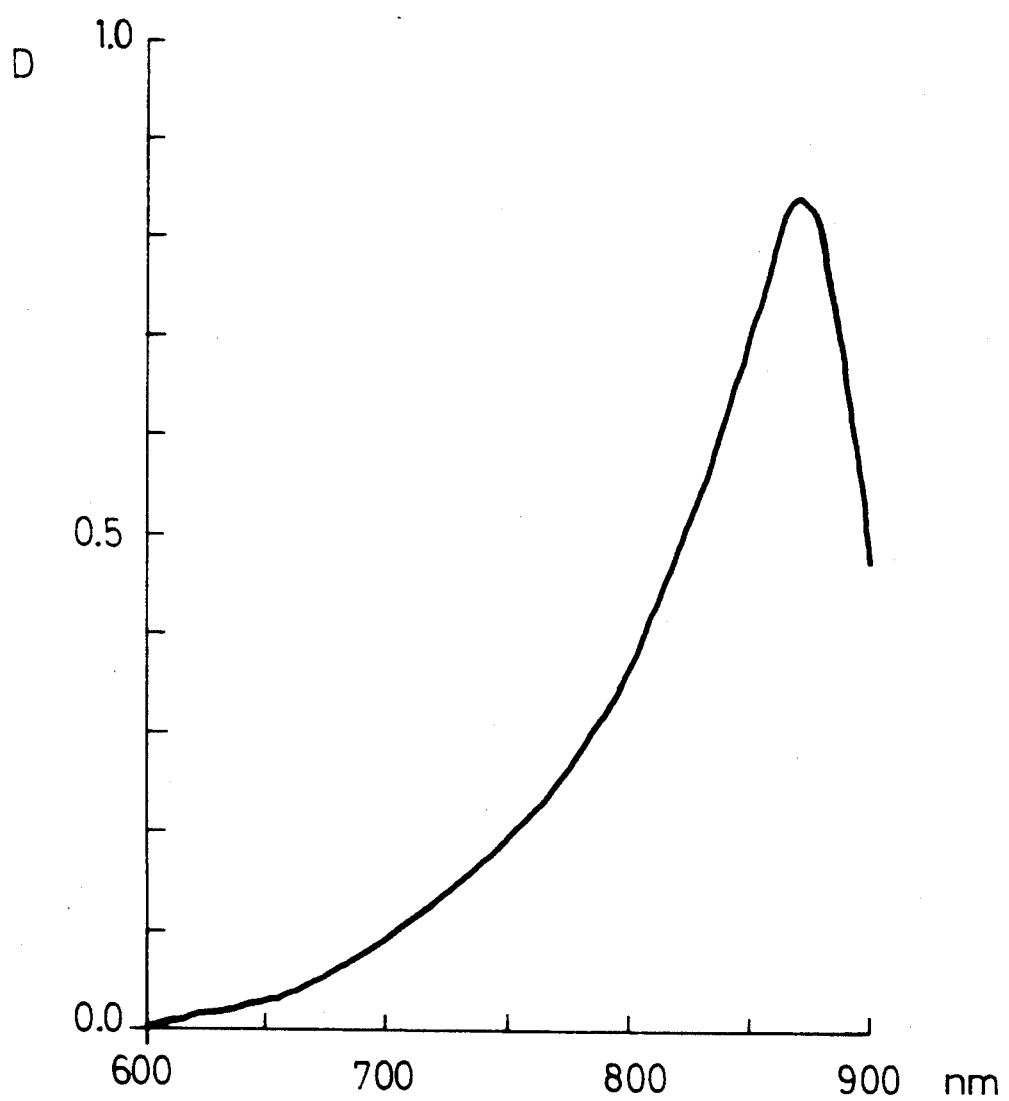
FIG. 2 represents the absorption curve (D versus nm) of the same dye in said layer after heat treatment and obtaining the microcrystalline state as described in Example 1.

After a heat-treatment at 70° C. for 30 minutes the absorption spectrum of the dried recording layer shows a bathochromic shift as can be learned from FIG. 2. The average size of the microcrystalline dye particles determined by Transmission Electron Microscopy (TEM) was 75 nm.

Figure 3:
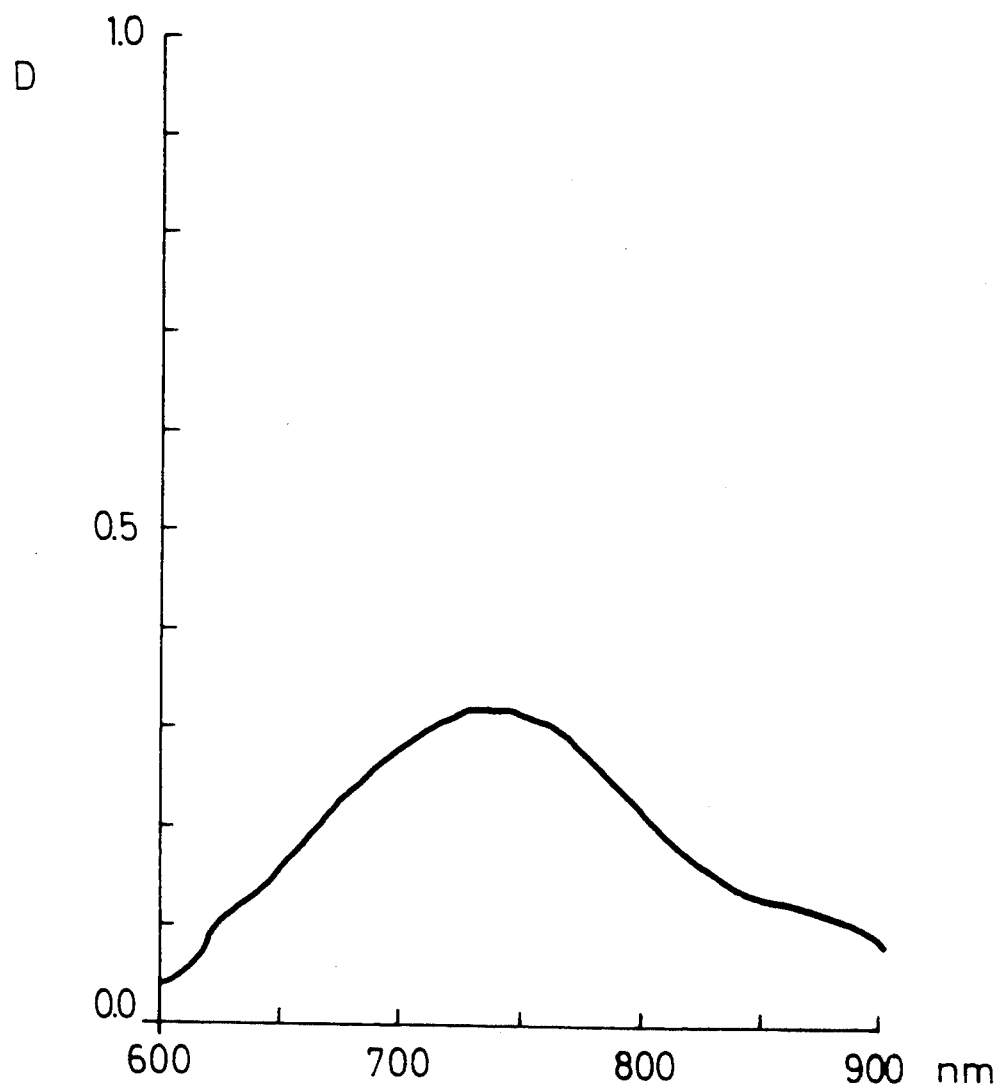
FIG. 3 represents the absorption curve (D versus nm) of the same heat treated recording layer after irradiation with laser light of 824 nm.

The overall heat treated recording layer was then exposed with 824 nm light using a solid state GaAs laser beam having at the recording layer surface a power of 27 mW. In the recording the laser was operated with pulses having a duration of about 100 nanosecond at a pulse frequency of 10 pulses/second. The energy of each laser pulse was 3 nJ striking the recording layer in an area of 7 μm². In the laser beam struck area a hypsochromic shift of 120 nm of the absorption maximum of the dye (see the absorption curve in FIG. 3) was obtained and the microcrystalline structure of the dye was destroyed. By increasing the duration of the laser pulse to 300 ns micropits were formed that are visually detectable under the microscope (800x enlargement) and readable in transmission by laser beam.

EXAMPLE 2

Example 1 was repeated with the difference however, that the coating of the recording layer was carried out on a glass support.

EXAMPLE 3

Figure 4:
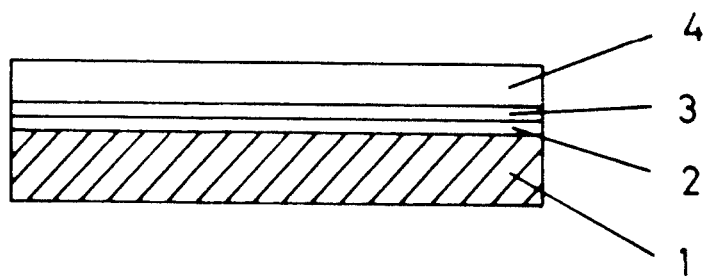
FIG. 4 represents a cross-sectional drawing of a laser beam recording tape according to the present invention.

Example 1 was repeated with the difference however, that the recording material had a tape structure (see the cross-sectional drawing in FIG. 4). Prior to applying the recording layer a polyethylene terephthalate ribbon support 1 was vacuum-coated with a reflective gold layer 2. Onto that gold layer 2 a recording layer 3 was coated from a coating composition as described in Example 1 at the same dry coating thickness. The dried recording layer was protected by applying thereon a protective layer 4 from polymethyl methacrylate dissolved in methylene chloride forming a dry protective layer having a thickness of 0.25 μm.

In the above defined recording tape the information was recorded as described in Example 1 and read in the reflection mode.

Electro-optical detection of the recorded information in the reflection mode was carried out by using a lower power (1 to 10 mW) scanning laser beam of a diode laser emitting in the wavelength range of 800 to 900 nm and detecting with a photomultiplier tube the light reflected through the hypsochromically shifted dye in the area that had been struck by the above defined 27 mW laser.

We claim:

1. A recording material suited for forming a direct-read-after-write image by laser beam radiation, which recording material contains in a recording layer a naphthoquinonimine dye either or not in admixture with a hydrophobic polymer, characterized in that said naphthoquinonimine dye is present in the recording layer in microcrystalline state having a particle size in the range of 0.01 to 0.1 micron hereby showing an absorption maximum situated in the 800 to 880 nm wavelength range, the weight ratio of said dye to said polymer being in the range from 1/99 to 100/0.

2. A recording material according to claim 1, wherein the colour of said recording layer is capable of undergoing a hypsochromic shift (shift to the blue) of at least 100 nm on irradiation with a semiconductor GaAs laser emitting at 824 nm and striking the recording layer with a laser beam having a spot diameter of 3 um and power at the recording layer surface of 27 mW.

3. A recording material according to claim 1, wherein said naphtoquinonimine dye is a coupling product of a 1-hydroxy-2-N-(thiazol-2-yl)-naphthamide coupler with an oxidized p-phenylene diamine selected from the group consisting of 2-amino-5-diethylamino-toluene hydrochloride, 2-amino-5-[N-ethyl-N-(methylsulphonylamino)-ethyl]-aminotoluene sulphate, 4-amino-3-methyl-N-ethyl-N-(Beta-hydroxyethyl)-aniline sulphate and N,N-diethyl-p-phenylene diamine sulphate.

4. A recording material according to claim 1, wherein said naphthoquinonimine dye corresponds to the following general formula:

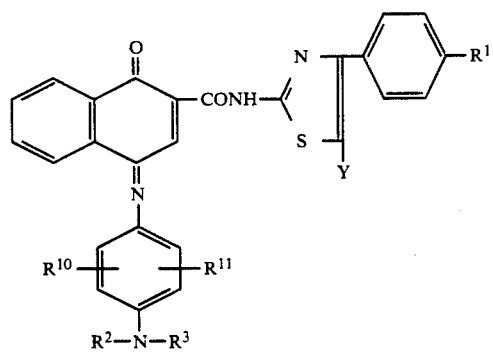

wherein:

$R^1$ is hydrogen, a $C_1$-$C_4$ alkyl group, or a $C_1$-$C_4$ alkoxy group including such alkoxy group substituted with halogen such as fluorine, Y is hydrogen or an alkyl group, each of $R^{10}$ and $R^{11}$ (same or different) is hydrogen, methyl, methoxy or acylamino, and each of $R^2$ and $R^3$ (same or different) is hydrogen, an alkyl group including a substituted alkyl group.

5. A recording material according to claim 4, wherein the naphthoquinonimine dye has one of the following structural formulae:

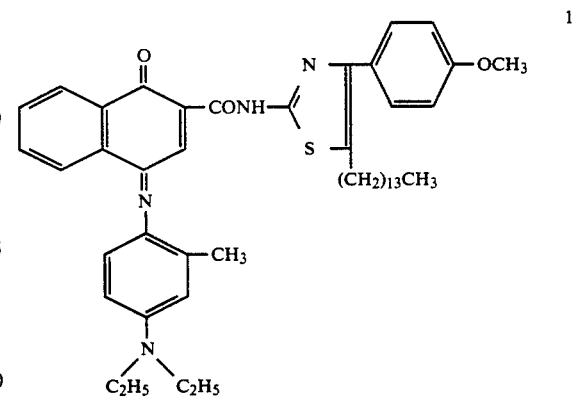

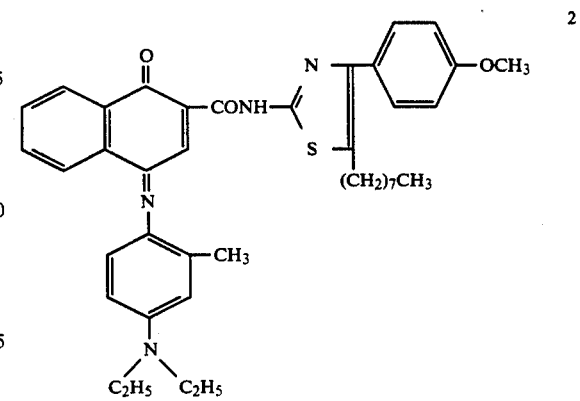

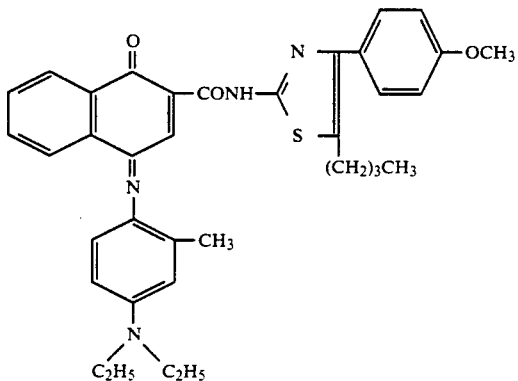

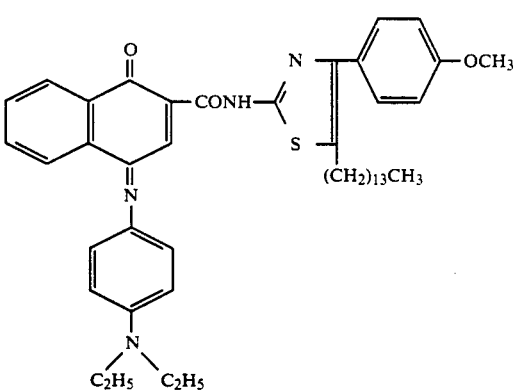

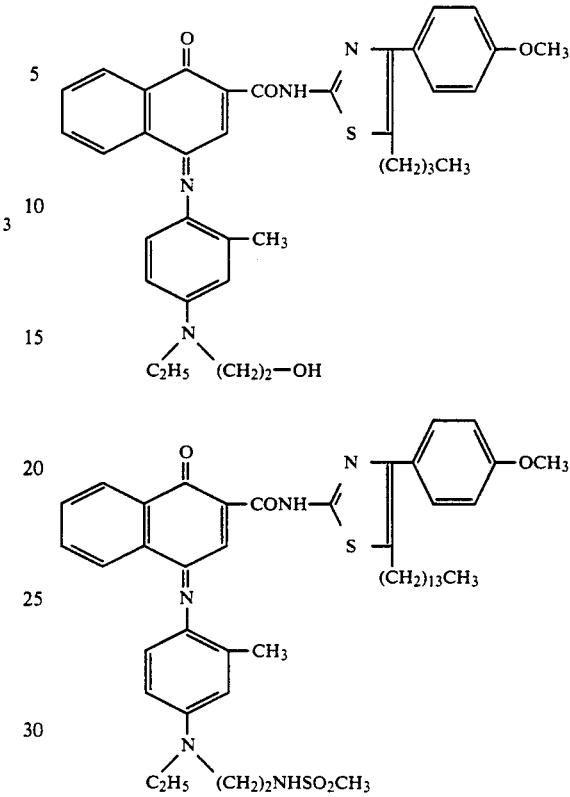

6. A recording material according to claim 1, wherein the resin binder contains at least one of the polymers selected from the group consisting of polycarbonates, polyesters, polyester-polycarbonates, polythiocarbonates, polyvinyl ethers, polyvinyl butyral, polyvinyl acetate, polystyrene, poly(Alpha-methylstyrene), polymethyl methacrylate (PMMA), copolymers of styrene with a (meth)acrylic ester, copolymers of styrene with butadiene, phenol-formaldehyde resins, polyolefins and chlorinated polyolefins.

7. A recording material according to claim 1, wherein the recording layer contains a dye a concentration sufficient to reach in the absorption maximum a spectral density of at least 0.1.

8. A recording material according to claim 1, wherein the dye to binder ratio by weight is in the range of 1/9 to 1/1.

9. A recording material according to claim 1, wherein said recording layer contains said dye in a coverage of at least 0.10 g/m².

* * * * *